United States Patent
Kim et al.

(10) Patent No.: US 9,456,359 B2
(45) Date of Patent: Sep. 27, 2016

(54) METHOD FOR REPORTING CHANNEL STATUS INFORMATION IN A MULTI-CELL COOPERATIVE WIRELESS COMMUNICATION SYSTEM, AND DEVICE FOR SAME

(75) Inventors: Hyungtae Kim, Anyang-si (KR); Hanbyul Seo, Anyang-si (KR); Kijun Kim, Anyang-si (KR); Daewon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 123 days.

(21) Appl. No.: 13/993,021

(22) PCT Filed: Dec. 19, 2011

(86) PCT No.: PCT/KR2011/009789
§ 371 (c)(1),
(2), (4) Date: Jun. 10, 2013

(87) PCT Pub. No.: WO2012/086981
PCT Pub. Date: Jun. 28, 2012

(65) Prior Publication Data
US 2013/0279460 A1    Oct. 24, 2013

Related U.S. Application Data

(60) Provisional application No. 61/427,086, filed on Dec. 23, 2010, provisional application No. 61/427,789, filed on Dec. 28, 2010, provisional application No. 61/429,451, filed on Jan. 3, 2011, provisional application No. 61/546,548, filed on Oct. 12, 2011.

(51) Int. Cl.
*H04W 24/02* (2009.01)
*H04L 5/00* (2006.01)
(Continued)

(52) U.S. Cl.
CPC ............ *H04W 24/02* (2013.01); *H04B 7/065* (2013.01); *H04L 5/0035* (2013.01);
(Continued)

(58) Field of Classification Search
None
See application file for complete search history.

(56) References Cited

U.S. PATENT DOCUMENTS

2008/0063115 A1* 3/2008 Varadarajan ......... H04B 7/0417
375/299
2008/0214198 A1* 9/2008 Chen et al. .................. 455/450
(Continued)

FOREIGN PATENT DOCUMENTS

KR  10-2008-0069753 A   7/2008
WO  WO 2010/123287 A2  10/2010

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 9)." 3GPP TS 36.213 V9.2.0, Jun. 2010.
(Continued)

*Primary Examiner* — Jeffrey M Rutkowski
*Assistant Examiner* — Andre Tacdiran
(74) *Attorney, Agent, or Firm* — Dentons US LLP

(57) ABSTRACT

The present invention relates to a method for reporting channel status information in a multi-cell cooperative wireless communication system, and to a device for same. In more detail, the method includes: receiving a reference signal from at least one of a serving cell and one or more neighboring cell; generating channel status information for multi-cell cooperative communication on the basis of the reference signal; dividing the channel status information for multi-cell cooperative communication on the basis of a predetermined feedback setting mode and allocating same on a plurality of subframes; and transmitting the channel status information for multi-cell cooperative communication to the serving cell by using the plurality of subframes.

10 Claims, 10 Drawing Sheets

(51) Int. Cl.
  *H04B 7/02* (2006.01)
  *H04L 1/00* (2006.01)
  *H04L 27/26* (2006.01)
  *H04W 24/10* (2009.01)
  *H04B 7/06* (2006.01)

(52) U.S. Cl.
  CPC ............ *H04L 5/0057* (2013.01); *H04B 7/024* (2013.01); *H04B 7/0639* (2013.01); *H04B 7/0689* (2013.01); *H04L 1/0026* (2013.01); *H04L 1/0028* (2013.01); *H04L 27/2602* (2013.01); *H04W 24/10* (2013.01)

(56) References Cited

U.S. PATENT DOCUMENTS

| | | | |
|---|---|---|---|
| 2009/0238303 A1* | 9/2009 | Mondal | H04B 7/0417 375/295 |
| 2010/0173660 A1* | 7/2010 | Liu et al. | 455/501 |
| 2010/0271968 A1* | 10/2010 | Liu et al. | 370/252 |
| 2011/0080965 A1* | 4/2011 | Liu | H04L 25/0224 375/260 |
| 2011/0116437 A1* | 5/2011 | Chen et al. | 370/312 |
| 2011/0149765 A1* | 6/2011 | Gorokhov et al. | 370/252 |
| 2011/0268007 A1* | 11/2011 | Barany et al. | 370/312 |
| 2012/0140649 A1* | 6/2012 | Choudhury et al. | 370/252 |
| 2012/0201321 A1* | 8/2012 | Koivisto et al. | 375/267 |
| 2012/0218937 A1* | 8/2012 | Chen et al. | 370/328 |
| 2012/0270535 A1* | 10/2012 | Chen et al. | 455/422.1 |
| 2013/0044685 A1* | 2/2013 | Fong et al. | 370/328 |
| 2013/0208678 A1* | 8/2013 | Zhang | 370/329 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 9)." 3GPP TS 36.212 V9.2.0, Jun. 2010.

* cited by examiner

FIG. 2
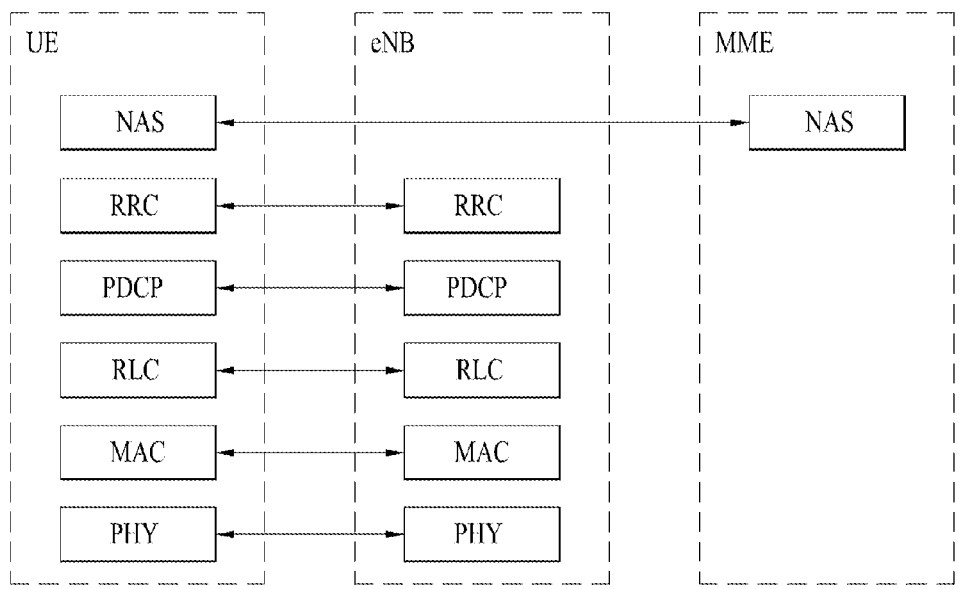
(a) Control-plane protocol stack
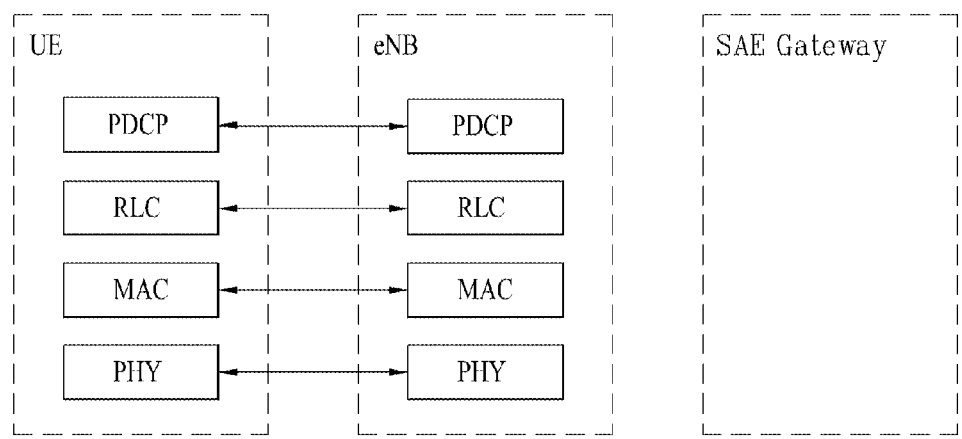
(a) Control-plane protocol stack

METHOD FOR REPORTING CHANNEL STATUS INFORMATION IN A MULTI-CELL COOPERATIVE WIRELESS COMMUNICATION SYSTEM, AND DEVICE FOR SAME

TECHNICAL FIELD

The present invention relates to a wireless communication system, and more particularly, to a method for reporting channel state information in a multi-cell cooperative wireless communication system and an apparatus therefor.

BACKGROUND ART

As an example of a mobile communication system to which the present invention is applicable, a 3rd Generation Partnership Project Long Term Evolution (hereinafter, referred to as "LTE") communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells is present per eNB. A cell is configured to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above-described discussion, the present invention is devised to propose a method for reporting channel state information in a multi-cell cooperative wireless communication system, and an apparatus therefor.

Technical Solution

In accordance with an aspect of the present invention, provided herein a method for transmitting channel state information at a user equipment in a multi-cell cooperative wireless communication system, including receiving a reference signal from at least one of a serving cell and one or more neighboring cells; generating channel state information for multi-cell cooperative communication based on the reference signal; allocating the channel state information for multi-cell cooperative communication to a plurality of subframes according to preset feedback configuration modes; and transmitting the channel state information for multi-cell cooperative communication to the serving cell, using the plurality of subframes.

In accordance with another aspect of the present invention, provided herein a user equipment in a multi-cell cooperative wireless communication system, including a reception module for receiving a reference signal from at least one of a serving cell and one or more neighboring cells; a processor for generating channel state information for multi-cell cooperative communication based on the reference signal and allocating the channel state information for multi-cell cooperative communication to a plurality of subframes according to preset feedback configuration modes; and a transmission module for transmitting the channel state information for multi-cell cooperative communication to the serving cell, using the plurality of subframes.

The channel state information for multi-cell cooperative communication may include channel state information corresponding to the serving cell and channel state information corresponding to the one or more neighboring cells. Preferably, the channel state information for multi-cell cooperative communication may include channel state information for receiving signals simultaneously both from the serving cell and from the one or more neighboring cells.

The preset feedback configuration modes may be distinguished according to multi-cell cooperative communication type. More broadly, the preset feedback configuration modes may be distinguished according to whether a multi-cell cooperative communication type applied to the user equipment is designated for the user equipment. Here, the user equipment may receive information about a multi-cell cooperative communication scheme from the serving cell.

The channel state information for multi-cell cooperative communication may be transmitted to the serving cell through a Physical Uplink Control Channel (PUCCH) of each of the plurality of subframes.

Advantageous Effects

According to the embodiments of the present invention, channel state information can be effectively transmitted in a multi-cell cooperative wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a view illustrating structures of a control plane and a user plane of a radio interface protocol between a UE and an E-UTRAN based on the 3GPP radio access network specification;

BEST MODE

Figure 1:
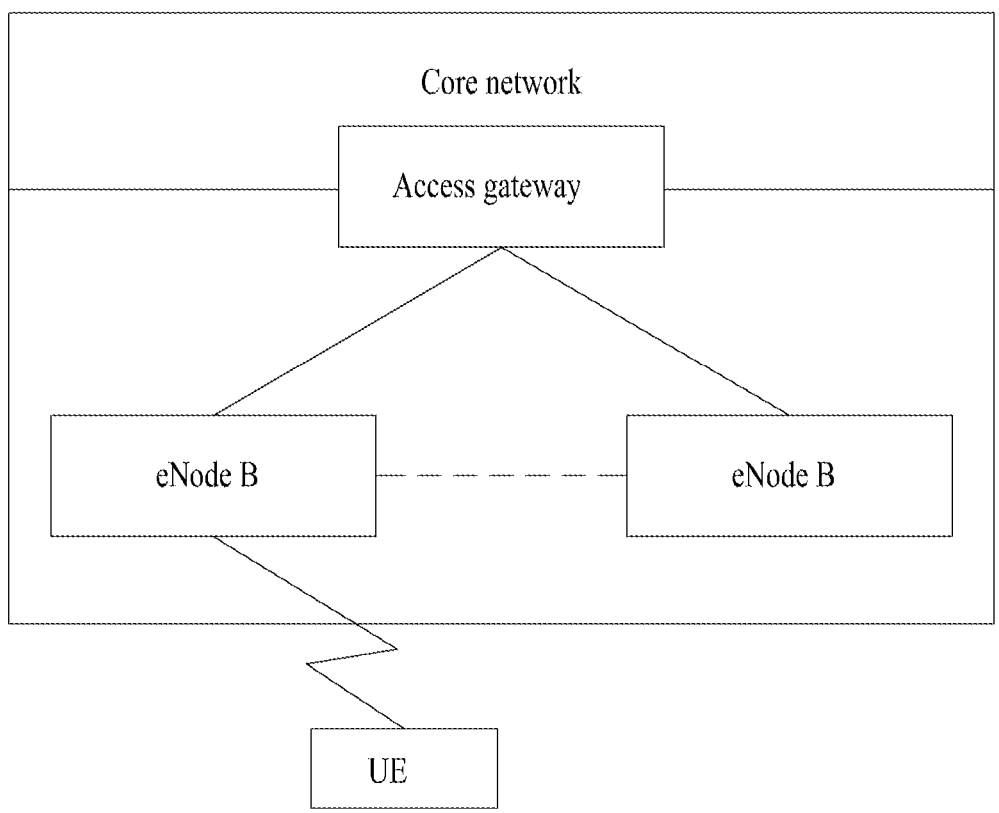
FIG. 1 is a view schematically illustrating a network structure of an E-UMTS as an exemplary radio communication system.

Hereinafter, structures, operations, and other features of the present invention will be understood readily from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems in accordance with the aforementioned definition. In addition, although the embodiments of the present invention will herein be described based on FDD mode, the FDD mode is only exemplary and the embodiments of the present invention can easily be applied to H-FDD mode or TDD mode.

FIG. 2 is a view illustrating structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
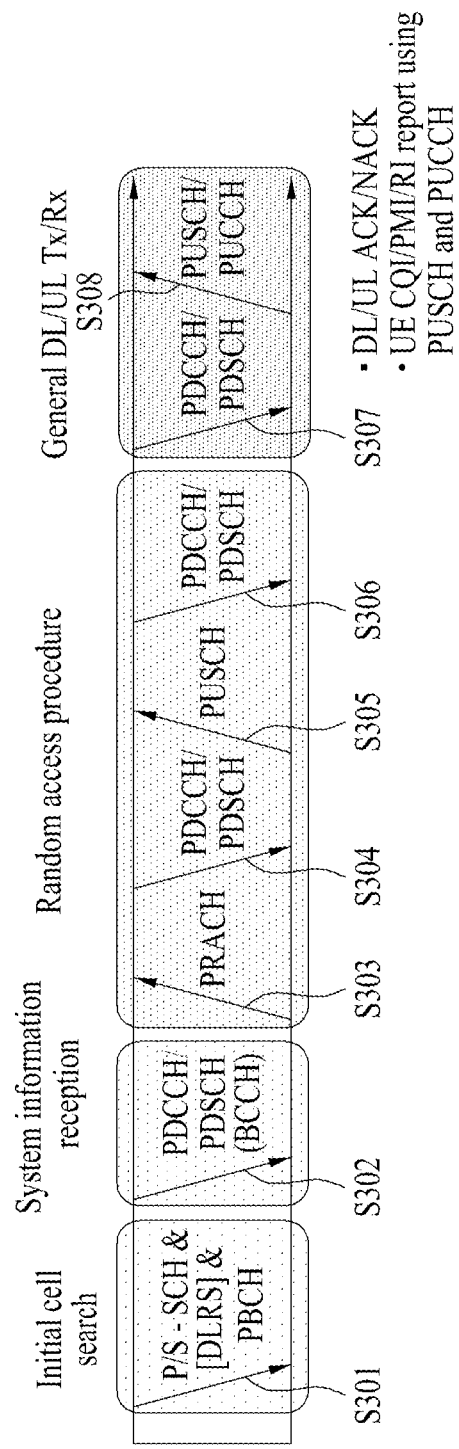
FIG. 3 is a view illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
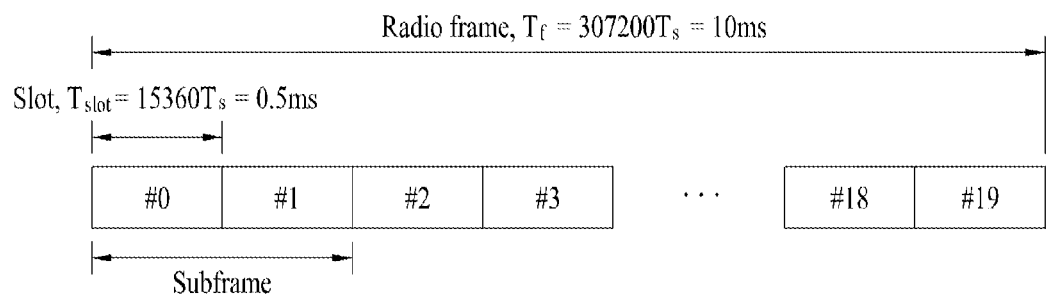
FIG. 4 is a view illustrating the structure of a radio frame used in an LTE system.

FIG. 4 is a view illustrating the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15 \text{ kHz} \times 2048)=3.2552 \times 10^{-8}$ (about 33 ns). Each slot includes a plurality of OFDM symbols in a time domain and includes a plurality of resource blocks in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
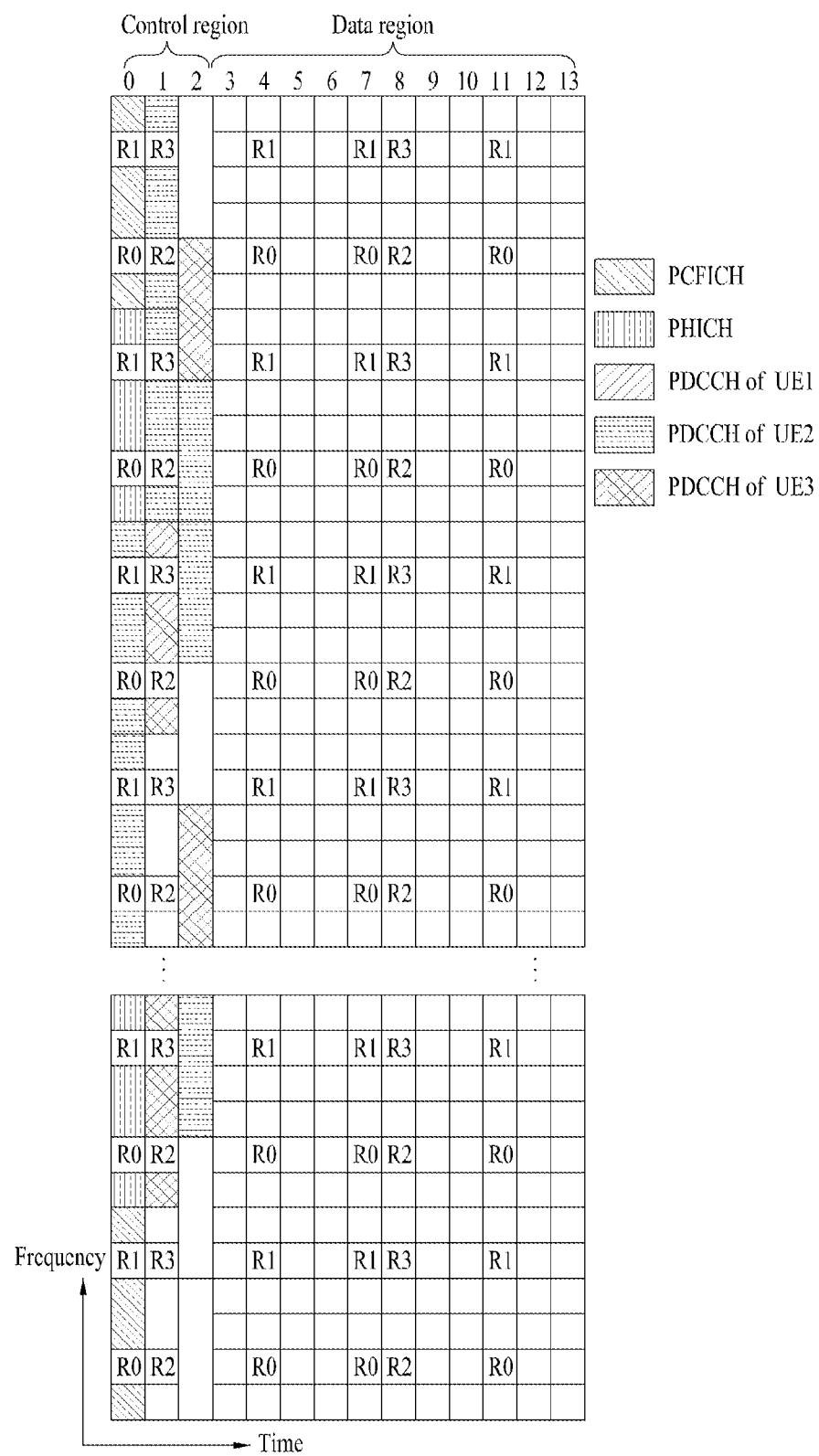
FIG. 5 is a view illustrating the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to a subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. The PCH and the DL-SCH are transmitted through the PDSCH. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A' and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
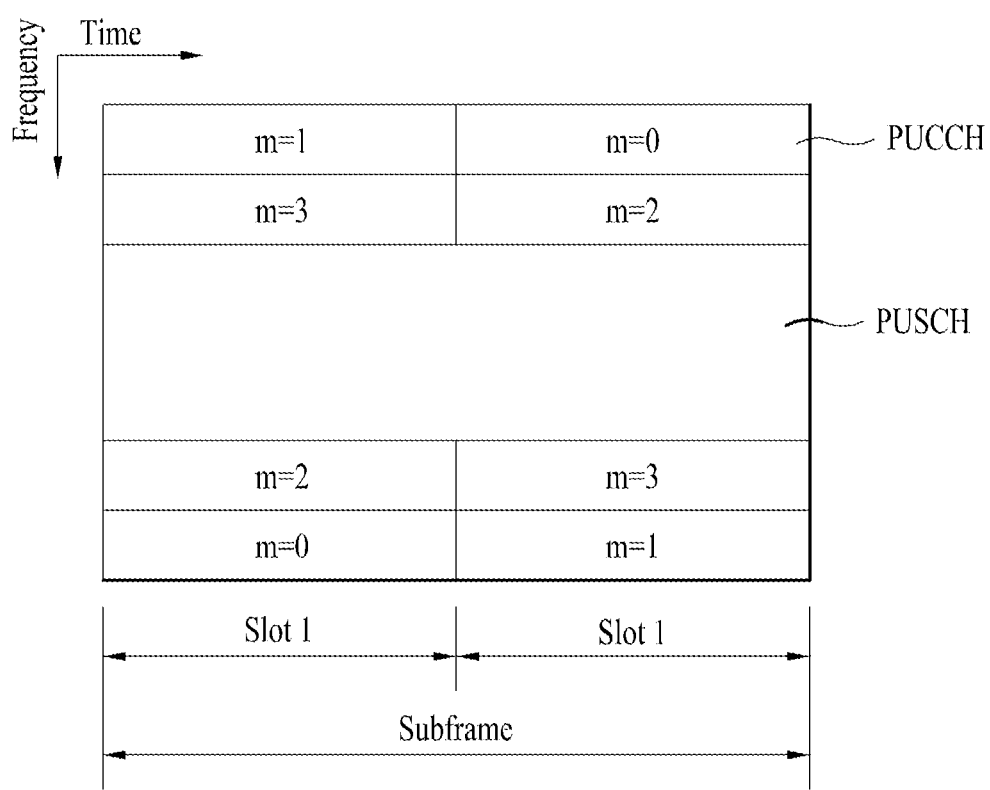
FIG. 6 is a view illustrating the structure of an uplink subframe used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
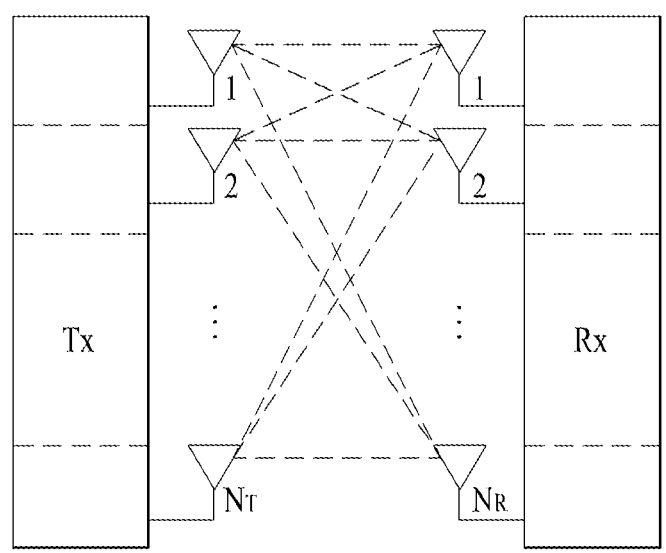
FIG. 7 is a view illustrating the configuration of a general MIMO communication system.

The configuration of a general MIMO communication system is shown in FIG. 7. A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3$^{rd}$ generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

# of streams≤rank(H)≤min($N_T$,$N_R$) [Equation 7]

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Meanwhile, in an LTE-A system of a next-generation mobile communication system, a Coordinated Multi-Point (CoMP) transmission scheme, which has not been supported in legacy standards, is expected to be supported to improve data transfer rate. The CoMP transmission scheme refers to a transmission scheme in which two or more eNBs or cells perform coordinate communication with a UE to improve communication performance between a UE located in a shadow area and an eNB (or cell or sector).

The CoMP transmission scheme may be divided into a coordinated MIMO Joint Processing (CoMP-JP) scheme through data sharing and a CoMP-Coordinated Scheduling/Beamforming (CoMP-CS/CB) scheme.

For downlink, in the CoMP-JP scheme, a UE may instantaneously and simultaneously receive data from individual eNBs employing a CoMP transmission scheme and may combine the received data, thereby improving reception performance (Joint Transmission (JT)). In addition, one of eNBs performing the CoMP-JP transmission scheme may transmit data to the UE at a specific time (Dynamic Point Selection (DSP)). In the CoMP-CS/CB scheme, however, the UE may instantaneously receive data from one eNB through beamforming.

For uplink, in the CoMP-JP scheme, individual eNBs may simultaneously receive a PUSCH signal from a UE. In the CoMP-CS/CB scheme, however, only one eNB receives the PUSCH signal. Whether to use the CoMP-CS/CB scheme is determined by coordinated cells (or eNBs).

Now, a description of a Channel State Information (CSI) report is given. In the current LTE standard, a MIMO transmission scheme is categorized into open-loop MIMO operated without channel information and closed-loop MIMO operated based on channel information. Especially, according to the closed-loop MIMO system, each of the eNB and the UE may be able to perform beamforming based on CSI to obtain a multiplexing gain of MIMO antennas. To obtain CSI from the UE, the eNB transmits an RS to the UE and commands the UE to feed back CSI measured based on the RS through a PUCCH or a PUSCH.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

According to determination of LTE-A standard, a final PMI is designed as W1, which a long-term and/or wideband PMI, and W2, which is a short-term and/or subband PMI.

An example of a hierarchical codebook transform scheme configuring one final PMI from W1 and W2 may use a long-term covariance matrix of a channel as indicated in Equation 8.

$W = \text{norm}(W1 W2)$ [Equation 8]

In the above equation, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9.

$$W1(i) = \begin{bmatrix} x_j & 0 \\ 0 & x_i \end{bmatrix},$$ [Equation 9]

where $X_i$ is Nt/2 by M matrix.

$$W2(j) = \begin{bmatrix} \overbrace{e_M^k \quad e_M^l \quad \cdots \quad e_M^m}^{r\ columns} \\ \alpha_j e_M^k \quad \beta_j e_M^l \quad \quad \gamma_j e_M^m \end{bmatrix}$$

(if rank=r), where 1≤k,l,m≤M and k,l,m are integer.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected.

For convenience of description, a rank-1 codeword generated by the aforementioned configurations is shown as follows.

$$W1(i) * W2(j) = \begin{bmatrix} X_i(k) \\ \alpha_j X_i(k) \end{bmatrix}$$ [Equation 10]

In Equation 10, a codeword is expressed as a vector of the number of Tx antennas, i.e. a vector of $N_T \times 1$, and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

In an evolved communication system such as LTE-A, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of an SU-MIMO scheme.

In CoMP JT, since a plurality of eNBs coordinately transmits the same data to a specific UE, CoMP JT may be theoretically considered as a MIMO system in which antennas are geographically distributed. Namely, even when MU-MIMO is performed in JT, CSI having high accuracy is needed to avoid interference between co-scheduled UEs as in single-cell MU-MIMO. In addition, in CoMP CB, accurate CSI is needed to avoid interference in which neighboring cells affect a serving cell. Generally, in order to raise accuracy of CSI feedback, the UE needs to additionally report CSI feedback to the eNB through a PUCCH or a PUSCH.

Meanwhile, for standards of a future communication system such as an LTE-A system, a MU-MIMO transmission scheme and the aforementioned CoMP transmission scheme have been proposed to achieve high transfer rate. For such enhanced transmission schemes, a UE-Advanced (UE-A) needs to feed back highly complex and various CSI to an eNB.

In an example of MU-MIMO, when the UE-A selects a PMI, a CSI feedback scheme for feeding back not only a desired PMI of the UE-A but also a PMI of a co-scheduled UE, i.e. a Best Companion PMI (BCPMI), is considered. That is, the UE-A calculates a BCPMI by which the co-scheduled UE creates less interference with respect thereto when the BCPMI is used as a precoder in a precoding matrix codebook and additionally feeds back the BCPMI to the eNB. The eNB schedules the UE-A and the co-scheduled UE using such information by applying the MU-MIMO scheme.

The BCPMI feedback scheme is largely classified into explicit feedback and implicit feedback according to whether a feedback payload is present.

The explicit feedback scheme including the feedback payload will be described first. In the explicit feedback scheme, the UE-A determines a BCPMI in a precoding matrix codebook and feeds back the determined BCPMI to the eNB through a control channel. As an example, the UE-A selects, from the codebook, an interference signal precoding matrix which maximizes an estimated SINR for an effective channel from a serving cell and feeds back the precoding matrix to the eNB as a BCPMI value.

The explicit feedback scheme has an advantage that the UE-A is able to selectively transmit a more effective BCPMI in eliminating interference. The UE-A considers each of all codewords in the codebook as an interference beam and compares metrics of SINR etc., thereby determining the most effective value for interference elimination as the BCPMI. Nonetheless, since candidates of the BCPMI increase as the size of a codeword increases, a larger feedback payload size is needed.

The implicit feedback scheme which does not include the feedback payload is described. In the implicit feedback scheme, if a desired PMI is determined, the UE-A statically determines a BCPMI corresponding to the desired PMI. In this case, the BCPMI is preferably comprised of vectors orthogonal to the determined desired PMI. This is because an interference signal selected by excluding the direction of the desired PMI is effective in mitigating interference since the desired PMI is configured in the direction of maximizing a channel gain of a channel H in order to maximize a reception SINR.

More specifically, if the channel H is decomposed into a plurality of independent channels through Singular Value Decomposition (SVD), the BCPMI determination scheme is more justified. A 4×4 channel H may be decomposed through SVD as follows.

$$H = U L V^H = [u_1 \ u_2 \ u_3 \ u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix}$$ [Equation 11]

In Equation 11, U and V are unitary matrices, and $u_i$, $v_i$ and $\lambda_i$ denote a 4×1 left singular vector of the channel H, a 4×1 right singular vector of the channel H, and a singular value of the channel H, respectively, arranged in descending order of $\lambda_i > \lambda_{i+1}$.

If a transmitter uses a beamforming matrix V and a receiver uses a beamforming matrix $U^H$, all channel gains that can theoretically be obtained are obtained without loss.

Specifically, if a rank is 1, optimal performance can be obtained in terms of SNR by acquiring a channel gain $|\lambda_1|^2$ upon using a transmission beamforming vector $v_1$ and a reception beamforming vector $u_1$. For example, in the case of rank 1, it is desirable that the UE-A select a precoding matrix that is most similar to $v_1$. Ideally, if a desired PMI is completely equal to $v_1$, a reception beam may be configured as $u_1$ and a transmission beam of an interference signal may be configured in a direction orthogonal to the desired PMI, so that the interference signal may be completely eliminated without signal loss.

In reality, if there is a slight difference between the desired PMI and $v_1$ due to a quantization error, the transmission beam of an interference signal configured in a direction orthogonal to the desired PMI is not equal to a beam orthogonal to $v_1$. Hence, although the interference signal cannot be completely eliminated, such configurations may be helpful to control the interference signal when there are fewer quantization errors.

If an LTE codebook of Table 1 shown below is used as an example of an implicit feedback scheme, a BCPMI may be expressed as a vector index orthogonal to a PMI of Table 1 and this is shown in Table 4. That is, three vectors orthogonal to a desired PMI are expressed as three BCPMIs as shown in Table 2 under the assumption that the number of Tx antennas is 4 and a reception rank of a UE that has fed back a PMI is 1.

For example, if PMI=3, a BCPMI is determined such that BCPMI=0, 1, 2. The PMI and the BCPMI denote indexes of codewords of a 4×1 vector in the codebook. The eNB regards a set of the BCPMIs (BCPMI=0, 1, 2) as a precoder effective in eliminating interference and uses some or all of the BCPMI set as a precoder of a co-scheduled UE.

The advantage of the implicit feedback scheme is that additional feedback overhead does not exist because the desired PMI and the BCPMI set are mapped in one-to-one correspondence as shown in Table 1 and Table 2. However, due to a quantization error of the desired PMI, a BCPMI depending on the desired PMI may also have an error in a desired beam direction for interference elimination.

In Table 2 for example, if there is no quantization error, all three BCPMIs indicate interference beams of completely eliminating interference. However, in the presence of an error, there may be a difference between each BCPMI and an ideal interference beam. Moreover, the difference between each BCPMI and an ideal interference beam may be uniform on average but may be greatly changed at a specific point of time. For example, if the desired PMI is 3, the BCPMIs may be effective in eliminating an interference signal in order of 0, 1, and 2 and the eNB that does not know a relative error of the BCPMIs of 0, 1, and 2 may configure the BCPMI of 2, which has the largest error between the BCPMI and the ideal interference beam, as an interference beam.

When MU-MIMO is performed, an eNB receiving WCPMI feedback determines a precoding matrix of a co-scheduled UE as a beam having a low correlation with the WCPMI, thereby mitigating interference.

In the case of a CoMP CB scheme, an eNB of a neighboring cell receiving WCPMI feedback determines a precoding matrix of a UE as a beam having a low correlation with the WCPMI to mitigate interference. In a CoMP JP scheme, an eNB of a neighboring cell receiving WCPMI feedback determines a precoding matrix of a UE as a beam having a high correlation with the WCPMI.

As additional feedback information, there is effective channel information. The effective channel is channel information obtained by applying a reception beamforming matrix to a measured channel. If the reception beamforming matrix of a UE is U and the measured channel is H, the effective channel is expressed as U·H. To acquire the effective channel information, the UE determines a reception beam capable of obtaining high reception quality from a channel with a serving eNB. Theoretically, the reception beam is determined as a conjugate transpose matrix of a left singular vector of a channel from the serving cell.

When a CoMP scheme is performed, a UE quantizes U·H which is an effective channel for a serving cell and U·$H_C$ which is an effective channel for a neighboring cell and transmits the quantized result to the serving cell. Upon receiving the quantized results, the serving cell configures a beam having a high correlation with the effective channel U·H. In addition, the neighboring cell performing a CoMP

TABLE 1

| Codebook index | $u_n$ | Number of layers ν | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

TABLE 2

| | SU MIMO rank-1 PMI | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| BCPMI | 1, 2, 3 | 2, 3, 0 | 3, 0, 1 | 0, 1, 2 | 5, 6, 7 | 6, 7, 4 | 7, 4, 5 | 4, 5, 6 | 9, 10, 11 | 10, 11, 8 | 11, 8, 9 | 8, 9, 10 | 13, 14, 15 | 14, 15, 12 | 15, 12, 13 | 12, 13, 14 |

Other feedback information considered as additional channel feedback for MU-MIMO and CoMP is a Worst Companion PMI (WCPMI). The WCPMI is the opposite concept of the BCPMI, indicating an index for a precoding matrix affecting the most severe interference on a UE when a PMI is used as a precoding matrix of an interference signal.

CB scheme determines a precoding matrix of the UE as a beam having a low correlation with U·$H_C$, thereby mitigating interference. If the neighboring cell performs a CoMP JT scheme, the neighboring cell determines the precoding matrix of the UE as a beam having a high correlation with U·$H_C$.

Accordingly, the UE needs to feed back CSI for the neighboring cell as well as CSI for the serving cell through a control channel in order to perform the CoMP scheme. CSI for the neighboring cell may vary according to details of the CoMP scheme. After the serving cell configures the detailed CoMP scheme for the UE, the UE preferably feeds back CSI for a corresponding CoMP scheme. However, if the UE does not discern the type of an applied CoMP scheme, it is preferable to feed back all CSI necessary for an arbitrary CoMP scheme.

FIRST EMBODIMENT

Prior to description of a CSI feedback method of the present invention in the case in which the above CoMP scheme is applied, a feedback scheme of a conventional non-CoMP system is described.

Figure 8:
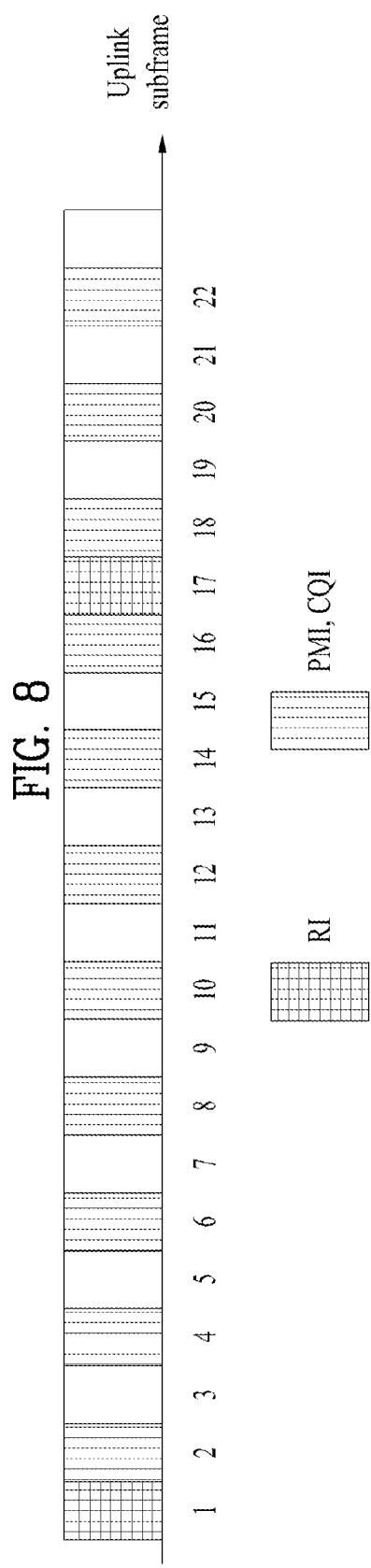
FIG. 8 is a view illustrating a general CSI feedback method.

FIG. 8 illustrates a general CSI feedback method. More specifically, it is assumed in FIG. 8 that all CSI such as RI, PMI, and CQI serves as information for a serving cell. Referring to FIG. 8, periods of RI, PMI, and CQI are 16 msec, 2 msec, and 2 msec, respectively. In the present invention, a CoMP CSI feedback scheme is proposed with reference to FIG. 8.

RI, which is transmitted at a relatively long period, does not need to be changed in a CoMP system. In a CoMP JP scheme, since neighboring cells participating in CoMP transmit the same data to a CoMP UE using the same rank, a common RI is needed. In a CoMP CB/CS scheme, the neighboring cells transmit data not to the CoMP UE but to UEs belonging to each cell and, thus, the CoMP UE need not transmit RI of the neighboring cells.

In the case of Dynamic Point Selection (DPS), although an RI for a neighboring cell may be needed since a different optimal RI may be configured for each cell, each cell may be restricted to use the same RI in consideration of feedback overhead. Accordingly, in CoMP CSI, one RI value rather than multiple RI values may be fed back as in the conventional non-CoMP system. In this case, RI may be a value calculated under the assumption that a CoMP scheme is applied or a value calculated from a channel of a serving eNB/transmitter before the CoMP scheme is applied. Alternatively, RI may be a minimum or maximum value of RI values calculated from all CoMP eNBs/transmitters participating in CoMP. In addition, RI may be set to a fixed value irrespective of a channel in order to simplify CoMP feedback and, in this case, CSI such as PMI, CQI, and Phase Corrector (PC) except for RI may be fed back at a corresponding time.

Feedback of PMI and CQI transmitted several times at a short period within the period of RI may be modified to transmission of non-CoMP CSI or CoMP CSI. A CoMP CSI feedback scheme of the present invention based on FIG. 8 is shown in Table 3.

TABLE 3

| Configuration number | Subframe 2 | Subframe 4 | Subframe 6 |
|---|---|---|---|
| 1 | Srv PMI<br>Srv CQI | Nbr PMI<br>CB CQI | PC<br>JT CQI when Nbr cell determines its beam based on Nbr PMI |
| 2 | Srv PMI<br>Srv CQI | Nbr PMI<br>CB CQI | PC<br>JT CQI when Nbr cell determines its beam based on Srv PMI |

TABLE 3-continued

| Configuration number | Subframe 2 | Subframe 4 | Subframe 6 |
|---|---|---|---|
| 3 | Srv PMI<br>Srv CQI | Nbr PMI<br>PC | CB CQI<br>JT CQI when Nbr cell determines its beam based on Nbr PMI |
| 4 | Srv PMI<br>Srv CQI | Nbr PMI<br>PC | CB CQI<br>JT CQI when Nbr cell determines its beam based on Srv PMI |
| 5 | Srv PMI<br>Srv CQI | Nbr PMI<br>Nbr CQI | PC<br>JT CQI when Nbr cell determines its beam based on Nbr PMI |
| 6 | Srv PMI<br>Srv CQI | Nbr PMI<br>Nbr CQI | PC<br>JT CQI when Nbr cell determines its beam based on Nbr PMI<br>CB CQI |
| 7 | Srv PMI<br>Srv CQI | Nbr PMI<br>Nbr CQI | CB CQI |

It is assumed that, in Table 3, an arbitrary CoMP scheme is applied to two cells and the applied CoMP scheme is not designated for a UE. In Table 3, an Srv PMI and an Srv CQI denote PMI information of a serving cell and CQI information of a serving cell, respectively. When CoMP is not performed, the serving cell determines a precoding matrix and a data transfer rate using the Srv PMI and Srv CQI.

In Table 3, an Nbr PMI may be a precoding matrix of a neighboring cell creating the strongest interference with respect to a CoMP UE or a precoding matrix of a neighboring cell creating the least interference with respect to the CoMP UE. The Nbr PMI is used to configure a precoding matrix of a neighboring cell in a CoMP CB/CS scheme or a CoMP JT scheme. A precoding matrix may be configured using the Nbr PMI in the CoMP CB scheme and using the Nbr PMI or Srv PMI in the CoMP JT scheme. For example, in Table 3, configuration number 1 configures a precoding matrix for the CoMP JT scheme based on the Nbr PMI and configuration number 2 configures a precoding matrix for the CoMP JT scheme based on the Srv PMI.

In Table 3, an Nbr CQI is a CQI which can be achieved when data is received from a neighboring CoMP cell and the other cells transmit or mute an interference signal, based on CoMP of a DPS scheme. A CB CQI is a CQI value estimated by a UE when the CoMP CB/CS scheme has been successfully performed. When the CoMP CB/CS scheme is performed, a data transfer rate to a CoMP UE is determined using the CB CQI.

In addition, in Table 3, PC is a phase/amplitude corrector used to adjust a precoder of the neighboring cell so that a signal transmitted from each cell may be constructively added and received when the CoMP JT scheme is received.

In configuration numbers 1, 3, and 5, a JT CQI is a CQI value estimated by the UE when the neighboring cell performs the CoMP JT scheme based on the Nbr PMI fed back in subframe 4 and is used to determine a data transfer rate to the CoMP UE when the CoMP JT scheme is performed.

In configuration numbers 2 and 4, a JT CQI is a CQI value estimated by the UE when the neighboring cell performs the CoMP JT scheme based on the Srv PMI fed back in subframe 2 and is used to determine a rate of data transfer to the CoMP UE when the CoMP JT scheme is performed.

CSI in all configuration numbers of Table 3 may be repeatedly applied even in subsequent subframes. Similarly, CSI in all configuration numbers of Table 4 to Table 11 may repeatedly applied even in subsequence subframes.

In a communication environment in which coherent JT is not supported, PC values indicated in all configuration numbers of Table 3 to Table 11 are not transmitted.

Meanwhile, in table 3, a new feedback configuration may be set by interchanging CSI values in subframe 4 and subframe 6. For example, if the CoMP JT scheme has higher priority than the CoMP CB/CS scheme, CSI necessary for the CoMP JT scheme may be fed back first relative to CSI necessary for the CoMP CB scheme. Accordingly, configuration 2 may be modified such that the PC and JT CQI are transmitted in subframe 4 and the Nbr PMI and CB CQI are transmitted in subframe 6. Then, an eNB may perform scheduling first using the CoMP JT scheme through CSI transmitted in subframe 4 prior to reception of CSI for the CoMP CB scheme. Similarly, even in Table 4 to Table 11, a new feedback configuration may be set by changing feedback order.

In Table 3, configuration numbers 3 and 4 show feedback configurations in which feedback positions of the PC and CB CQI in configuration numbers 1 and 2, respectively, are interchanged. If accuracy of channel information of a neighboring cell is important and thus a large CB PMI codebook is used and if the codebook size of the PC is smaller than the payload size of the CB CQI, configuration numbers 3 and 4 may be used to feed back more accurate PMI information for the neighboring cell.

The feedback configuration as shown in Table 3 may be designated to the UE through higher-layer signaling or through downlink control information.

As described above, Table 3 shows a feedback operation of various CoMP CSI so that the eNB may apply an arbitrary CoMP scheme to the UE when the eNB does not specify a specific CoMP scheme for the UE. On the other hand, if the eNB specifies a specific CoMP scheme for the UE, the UE may simply feed back only CSI for the corresponding CoMP scheme.

Table 4 shows a CSI feedback configuration of the UE when the eNB designates a specific CoMP scheme for the UE. Specifically, Table 4 shows CSI transmitted in subframe 2 and subframe 4 based on FIG. 8, for convenience of description.

TABLE 4

| Configuration number | Subframe 2 | Subframe 4 |
|---|---|---|
| 1 | Srv PMI<br>CB CQI | Nbr PMI<br>(Enhanced PMIs if necessary) |
| 2 | Srv PMI<br>JT CQI when Nbr cell determines its beam based on Nbr PMI | Nbr PMI<br>PC<br>(Enhanced PMIs if necessary) |
| 3 | Srv PMI<br>Srv CQI | Nbr PMI<br>Nbr CQI |
| 4 | Srv PMI | JT CQI when Nbr cell determines its beam based on Srv PMI<br>PC |

Hereinafter, a feedback configuration corresponding to each configuration number of Table 4 will be described.

1) Configuration number 1: When a CoMP CB/CS scheme is designated, a CoMP UE feeds back a PMI to be used by a serving cell and a CQI value (a CB CQI) when the CoMP CB/CS scheme is performed in subframe 2. In addition, in subframe 4, the CoMP UE feeds back an Nbr PMI to be used by a neighboring cell to apply the CoMP CB/CS scheme. In this case, since the Nbr PMI is independently transmitted, an Nbr PMI value having fewer quantization errors may be transmitted using a codebook having high granularity. Additionally, a compensation value for reducing quantization errors of an Srv PMI may be transmitted in subframe 4 together with the Nbr PMI.

2) Configuration number 2: If a CoMP JT scheme is determined, the CoMP UE feeds back a PMI to be used by the serving cell and a CQI value (a JT CQI) when the CoMP JT scheme is performed in subframe 2. In subframe 4, the CoMP UE feeds back an Nbr PMI and a PC used by the neighboring cell to apply the CoMP JT scheme. In addition, a compensation value for reducing quantization errors of an Srv PMI may be transmitted in subframe 4 together with the Nbr PMI.

3) Configuration number 3: When the CoMP scheme is determined as DPS, the CoMP UE feeds back a PMI to be used by the serving cell when the serving cell is selected as DPS and a CQI of the serving cell, in subframe 2. In subframe 4, the CoMP UE feeds back a PMI to be used by the neighboring cell when the neighboring cell is selected as DPS and a CQI of the neighboring cell.

4) Configuration number 4: Configuration 4 corresponds to the case where the CoMP JT scheme is determined as in Configuration 2. The CoMP UE feeds back a PMI to be used by the serving cell and the neighboring cell in subframe 2 and feeds back a JT CQI and a PC to be used by the neighboring cell to apply the CoMP JT scheme in subframe 4.

Additionally, a new feedback configuration for the case where a specific CoMP scheme is designated for the UE may be applied using a combination of CSI transmitted in subframe 2 of Table 3 and CSI transmitted in subframe 4 of Table 3 and a combination of CSI transmitted in subframe 2 of Table 3 and CSI transmitted in subframe 6 of Table 3.

Likewise, a new feedback configuration for the case where a specific CoMP scheme is not designated for the UE may be applied by repeatedly using different feedback configurations of Table 4 over several subframes. For example, the feedback configuration of configuration number 1 of Table 4 may be applied in subframe 2 and subframe 4 and the feedback configuration of configuration number 2 of Table 4 may be applied in subframe 6 and subframe 8.

For a feedback configuration of a CoMP scheme of the present invention, the CoMP UE may feed back CSI by applying a plurality of CoMP feedback configurations in parallel. For example, if it is possible to perform scheduling through two carriers in a carrier aggregation based communication system, the CoMP UE may individually apply a CoMP scheme for each carrier. In this case, the CoMP UE may simultaneously feed back CSI for a first carrier and a second carrier.

In Tables 3 and 4, the CB CQI and the JT CQI may be configured as relative delta CQIs calculated based on respective Srv CQIs to reduce feedback overhead. For example, if the CB CQI value is configured as '+1' as a delta CQI, a CoMP DB/CS CQI may be configured as 'Srv CQI+1'.

When a plurality of codewords (or transport blocks) is transmitted, the same CB CQI and the same JT CQI may be configured for all codewords (or transport blocks) to reduce feedback overhead. For example, if the CoMP UE desires to receive codeword 1 and codeword 2 from the eNB, the CoMP UE feeds back only a CB CQI value and a JT CQI value which are identically applied to the two codewords rather than a CB CQI value and a JT CQI value for each of the two codewords. Such an identically applied CQI is referred to as a common CQI.

The common CQI and the delta CQI may be simultaneously applied. For example, one delta CQI for multiple codewords may be applied. This CQI is referred to as a delta common CQI.

If the above-described delta CQI, common CQI, and delta common CQI are used, Table 3 may be modified as shown in Table 5. Even in configuration numbers 6 and 7 of Table 3, the delta CQI, common CQI, and delta common CQI may be used.

Meanwhile, as the feedback configuration of the present invention is applied, feedback payload may be reduced. The reduced payload may be used for various purposes for more accurate CSI transmission.

First, channel accuracy may be raised by determining an Nbr PMI and a PC using a codebook having higher granularity. If a codebook for the Nbr PMI and PC is configured through sampling in a large codebook, codebook granularity may be raised by increasing sampling size.

Second, channel accuracy may be raised by densely quantizing yjr Nbr PMI in the unit of a vector. For example,

TABLE 5

| Configuration number | Subframe 2 | Subframe 4 | Subframe 6 |
|---|---|---|---|
| 1-1 | Srv PMI<br>Srv CQI | Nbr PMI<br>CB delta CQI | PC<br>JT delta CQI when Nbr cell determines its beam based on Nbr PMI |
| 1-2 | Srv PMI<br>Srv CQI | Nbr PMI<br>CB common CQI | PC<br>JT common CQI when Nbr cell determines its beam based on Nbr PMI |
| 1-3 | Srv PMI<br>Srv CQI | Nbr PMI<br>CB delta common CQI | PC<br>JT delta common CQI when Nbr cell determines its beam based on Nbr PMI |
| 2-1 | Srv PMI<br>Srv CQI | Nbr PMI<br>CB delta CQI | PC<br>JT delta CQI when Nbr cell determines its beam based on Srv PMI |
| 2-2 | Srv PMI<br>Srv CQI | Nbr PMI<br>CB common CQI | PC<br>JT comnon CQI when Nbr cell determines its beam based on Srv PMI |
| 2-3 | Srv PMI<br>Srv CQI | Nbr PMI<br>CB delta common CQI | PC<br>JT delta common CQI when Nbr cell determines its beam based on Srv PMI |
| 3-1 | Srv PMI<br>Srv CQI | Nbr PMI<br>PC | CB delta CQI<br>JT delta CQI when Nbr cell determines its beam based on Nbr PMI |
| 3-2 | Srv PMI<br>Srv CQI | Nbr PMI<br>PC | CB common CQI<br>JT common CQI when Nbr cell determines its beam based on Nbr PMI |
| 3-3 | Srv PMI<br>Srv CQI | Nbr PMI<br>PC | CB delta common CQI<br>JT delta common CQI when Nbr cell determines its beam based on Nbr PMI |
| 4-1 | Srv PMI<br>Srv CQI | Nbr PMI<br>PC | CB delta CQI<br>JT delta CQI when Nbr cell determines its beam based on Srv PMI |
| 4-2 | Srv PMI<br>Srv CQI | Nbr PMI<br>PC | CB common CQI<br>JT common CQI when Nbr cell determines its beam based on Srv PMI |
| 4-3 | Srv PMI<br>Srv CQI | Nbr PMI<br>PC | CB delta common CQI<br>JT delta common CQI when Nbr cell determines its beam based on Srv PMI |
| 5-1 | Srv PMI<br>Srv CQI | Nbr PMI<br>Nbr CQI | PC<br>JT delta CQI when Nbr cell determines its beam based on Nbr PMI |
| 5-2 | Srv PMI<br>Srv CQI | Nbr PMI<br>Nbr CQI | PC<br>JT common CQI when Nbr cell determines its beam based on Nbr PMI |
| 5-3 | Srv PMI<br>Srv CQI | Nbr PMI<br>Nbr CQI | PC<br>JT delta common CQI when Nbr cell determines its beam based on Nbr PMI | if the Nbr PMI corresponds to an effective channel and an RI is 2, two column vectors constituting an effective channel may be quantized in the unit of a vector and the quantized vectors may be fed back.

SECOND EMBODIMENT

In the above example, it has been assumed that both a serving cell and one neighboring cell perform a CoMP scheme for convenience of description. However, the present invention may be extended to the case where two or more neighboring cells participate in CoMP.

First, a JT CQI and a CB CQI are modified to CQI values capable of being obtained when the CoMP scheme is applied to two neighboring cells and Nbr PMI 1 and Nbr PMI 2 corresponding respectively to a first neighboring cell and a second neighboring cell are fed back instead of one Nbr PMI. In addition, instead of one PC, PC 1 and PC 2 corresponding respectively to the first neighboring cell and the second neighboring cell are fed back. Alternatively, PC 1 and PC 2 may be restricted to the same value so that only one value may be transmitted.

Next, if the payload size which can be transmitted through a control channel is restricted, the size of a CQI payload may be reduced using the aforementioned delta CQI and common CQI. Thus, the payload size necessary for additional feedback may be ensured.

It is apparent that CSI for an added neighboring cell (e.g. the second neighboring cell) may be fed back in the next subframe. That is, in the example of Table 3, CSI is measured in subframe 4 and subframe 6 based on the first neighboring cell and CSI which is the same as the CSI in subframe 4 and subframe 6 is measured based on the second neighboring cell in the next subframe 8 and subframe 10, respectively.

Additionally, feedback schemes shown in Tables 6, 7, 8, and 9 may be considered.

Particularly, in Table 9, CSI transmitted in subframe 8 in the feedback configuration of Table 8 is added. In subframe 8, an enhance PMI is transmitted to raise a CQI and a PMI accuracy estimated when all cells participate in CB or JT.

In Tables 6 to 9, a CB1 CQI denotes a CQI estimated when only the first neighboring cell performs the CoMP CB scheme using an Nbr PMI1 and a CB2 CQI denotes a CQI estimated when only the second neighboring cell performs the CoMP CB scheme using an Nbr PMI2. A CB12 CQI denotes a CQI estimated when the first neighboring cell and the second neighboring cell perform the CoMP CB scheme using the Nbr PMI1 and the Nbr PM2, respectively.

Furthermore, a JT1 CQI indicates a CQI estimated when only the first neighboring cell performs a CoMP JT scheme and a JT2 CQI indicates a CQI estimated when only the second neighboring cell performs the CoMP JT scheme. Similarly, a JT12 CQI indicates a CQI estimated when the first neighboring cell and second neighboring cell perform the CoMP JT scheme.

TABLE 6

| Configuration number | Subframe 2 | Subframe 4 | Subframe 6 |
|---|---|---|---|
| 1 | Srv PMI<br>CB1 CQI<br>CB2 CQI | Nbr1 PMI<br>(Enhanced PMIs if necessary) | Nbr2 PMI<br>(Enhanced PMIs if necessary) |
| 2 | Srv PMI<br>CB12 CQI | Nbr1 PMI<br>(Enhanced PMIs if necessary) | Nbr2 PMI<br>(Enhanced PMIs if necessary) |
| 3 | Srv PMI<br>CB12 CQI | Nbr1 PMI<br>CB1 CQI | Nbr2 PMI<br>CB2 CQI |
| 4 | Srv PMI<br>JT12 CQI when Nbr cell 1 and 2 determine its beam based on Srv PMI | JT1 CQI when Nbr cell 1 determines its beam based on Srv PMI<br>PC1 | JT2 CQI when Nbr cell 2 determines its beam based on Srv PMI<br>PC2 |
| 5 | Srv PMI<br>JT12 CQI when Nbr cell 1 and 2 determine its beam based on Nbr1 PMI and Nbr2 PMI, respectively. | Nbr1 PMI<br>PC1 | Nbr2 PMI<br>PC2 |
| 6 | Srv PMI<br>JT12 CQI when Nbr cell 1 and 2 determine its beam based on Nbr1 PMI and Nbr2 PMI, respectively. | Nbr1 PMI<br>JT1 CQI when Nbr cell 1 determines its beam based on Nbr1 PMI<br>PC1 | Nbr2 PMI<br>JT2 CQI when Nbr cell 2 determines its beam based on Nbr2 PMI<br>PC2 |
| 7 | Srv PMI<br>Srv CQI | Nbr1 PMI<br>Nrb1CQI | Nbr2 PMI<br>Nrb2 CQI |

Table 6 shows a CoMP CSI feedback configuration proposed in the present invention when the CoMP scheme is applied to the serving cell, the first neighboring cell, and the second neighboring cell and when the applied CoMP scheme is designated for the UE.

TABLE 7

| Configuration number | Subframe 2 | Subframe 4 | Subframe 6 | Subframe 8 |
|---|---|---|---|---|
| 1 | Srv PMI<br>Srv CQI | Nbr1 PMI<br>Nrb1CQI | Nbr2 PMI<br>Nrb2 CQI | PC1<br>PC2<br>JT12 CQI |

TABLE 8

| Configuration number | Subframe 2 | Subframe 4 | Subframe 6 |
|---|---|---|---|
| 1 | Srv PMI<br>Srv CQI | Nbr1 PMI<br>CB1 CQI | Nbr2 PMI<br>CB2 CQI |
| 2 | Srv PMI<br>Srv CQI<br>CB12 CQI | Nbr1 PMI<br>CB1 CQI | Nbr2 PMI<br>CB2 CQI |
| 3 | Srv PMI<br>Srv CQI | Nbr1 PMI<br>JT1 CQI when Nbr cell 1 determines its beam based on Nbr1 PMI<br>PC1 | Nbr2 PMI<br>JT2 CQI when Nbr cell 2 determines its beam based on Nbr2 PMI<br>PC2 |
| 4 | Srv PMI<br>Srv CQI | JT1 CQI when Nbr cell 1 determines its beam based on Srv PMI<br>PC1 | JT2 CQI when Nbr cell 2 determines its beam based on Srv PMI<br>PC2 |
| 5 | Srv PMI<br>Srv CQI<br>JT12 CQI when Nbr cell 1 and 2 determine its beam based on Nbr1 PMI and Nbr2 PMI, respectively. | Nbr1 PMI<br>JT1 CQI when Nbr cell 1 determines its beam based on Nbr1 PMI<br>PC1 | Nbr2 PMI<br>JT2 CQI when Nbr cell 2 determines its beam based on Nbr2 PMI<br>PC2 |
| 6 | Srv PMI<br>Srv CQI<br>JT12 CQI when Nbr cell 1 and 2 determine its beam based on Srv PMI | JT1 CQI when Nbr cell 1 determines its beam based on Srv PMI<br>PC1 | JT2 CQI when Nbr cell 2 determines its beam based on Srv PMI<br>PC2 |
| 7 | Srv PMI<br>Srv CQI | Nbr1 PMI<br>JT1 CQI when Nbr cell 1 determines its beam based on Nbr1 PMI<br>CB1 CQI<br>PC1 | Nbr2 PMI<br>JT2 CQI when Nbr cell 2 determines its beam based on Nbr2 PMI<br>CB2 CQI<br>PC2 |
| 8 | Srv PMI<br>Srv CQI | Nbr1 PMI<br>Nbr2 PMI<br>CB1 CQI<br>CB2 CQI | JT1 CQI when Nbr cell 1 determines its beam based on Nbr1 PMI<br>JT2 CQI when Nbr cell 2 determines its beam based on Nbr2 PMI<br>PC1<br>PC2 |
| 9 | Srv PMI<br>Srv CQI | Nbr1 PMI<br>Nbr2 PMI<br>CB1 CQI<br>CB2 CQI | JT1 CQI when Nbr cell 1 determines its beam based on Srv PMI<br>JT2 CQI when Nbr cell 2 determines its beam based on Srv PMI<br>PC1<br>PC2 |

TABLE 9

| Configuration number | Subframe 2 | Subframe 4 | Subframe 6 | Subframe 8 |
|---|---|---|---|---|
| 1 | Srv PMI<br>Srv CQI | Nbr1 PMI<br>CB1 CQI | Nbr2 PMI<br>CB2 CQI | CB12 CQI<br>(Enhanced PMIs if necessary) |
| 2 | Srv PMI<br>Srv CQI | Nbr1 PMI<br>CB1 CQI | Nbr2 PMI<br>CB2 CQI | CB 12 CQI<br>(Enhanced PMIs if necessary) |
| 3 | Srv PMI<br>Srv CQI | Nbr1 PMI<br>JT1 CQI when Nbr cell 1 determines its beam based on Nbr1 PMI<br>PC1<br>PC1 | Nbr2 PMI<br>JT2 CQI when Nbr cell 2 determines its beam based on Nbr2 PMI<br>PC2 | JT12 CQI when Nbr cell 1 and 2 determine its beam based on Nbr1 PMI and Nbr2 PMI, respectively.<br>(Enhanced PMIs if necessary) |

TABLE 9-continued

| Configuration number | Subframe 2 | Subframe 4 | Subframe 6 | Subframe 8 |
|---|---|---|---|---|
| 4 | Srv PMI<br>Srv CQI | JT1 CQI when Nbr cell 1 determines its beam based on Srv PMI<br>PC1 | JT2 CQI when Nbr cell 2 determines its beam based on Srv PMI<br>PC2 | JT 12 CQI when Nbr cell 1 and 2 determine its beam based on Srv PMI<br>(Enhanced PMIs if necessary) |
| 5 | Srv PMI<br>Srv CQI | Nbr1 PMI<br>JT1 CQI when Nbr cell 1 determines its beam based on Nbr1 PMI<br>PC1<br>PC1 | Nbr2 PMI<br>JT2 CQI when Nbr cell 2 determines its beam based on Nbr2 PMI<br>PC2 | JT12 CQI when Nbr cell 1 and 2 determine its beam based on Nbr1 PMI and Nbr2 PMI, respectively.<br>(Enhanced PMIs if necessary) |
| 6 | Srv PMI<br>Srv CQI | JT1 CQI when Nbr cell 1 determines its beam based on Srv PMI<br>PC1 | JT2 CQI when Nbr cell 2 determines its beam based on Srv PMI<br>PC2 | JT12 CQI when Nbr cell 1 and 2 determine its beam based on Srv PMI<br>(Enhanced PMIs if necessary) |
| 7 | Srv PMI<br>Srv CQI | Nbr1 PMI<br>JT1 CQI when Nbr cell 1 determines its beam based on Nbr1 PMI<br>CB1 CQI<br>PC1 | Nbr2 PMI<br>JT2 CQI when Nbr cell 2 determines its beam based on Nbr2 PMI<br>CB2 CQI<br>PC2 | JT 12 CQI when Nbr cell 1 and 2 determine its beam based on Nbr1 PMI and Nbr2 PMI, respectively<br>CB 12 CQI<br>(Enhanced PMIs if necessary) |
| 8 | Srv PMI<br>Srv CQI | Nbr1 PMI<br>Nbr2 PMI<br>CB1 CQI<br>CB2 CQI | JT1 CQI when Nbr cell 1 determines its beam based on Nbr1 PMI<br>JT2 CQI when Nbr cell 2 determines its beam based on Nbr2 PMI<br>PC1<br>PC2 | JT 12 CQI when Nbr cell 1 and 2 determine its beam based on Nbr1 PMI and Nbr2 PMI, respectively<br>CB 12 CQI<br>(Enhanced PMIs if necessary) |
| 9 | Srv PMI<br>Srv CQI | Nbr1 PMI<br>Nbr2 PMI<br>CB1 CQI<br>CB2 CQI | JT1 CQI when Nbr cell 1 determines its beam based on Srv PMI<br>JT2 CQI when Nbr cell 2 determines its beam based on Srv PMI<br>PC1<br>PC2 | JT 12 CQI when Nbr cell 1 and 2 determine its beam based on Srv PMI<br>CB 12 CQI<br>(Enhanced PMIs if necessary) |

THIRD EMBODIMENT

Meanwhile, in LTE-A standard, CSI feedback configurations may vary with the number of Tx antennas. For an 8Tx antenna configuration newly supported in LTE-A standard, a feedback mode different from that of 2 Tx antennas or 4 Tx antennas of the legacy LTE standard is provided. A typical example is shown in FIG. 9.

Figure 9:
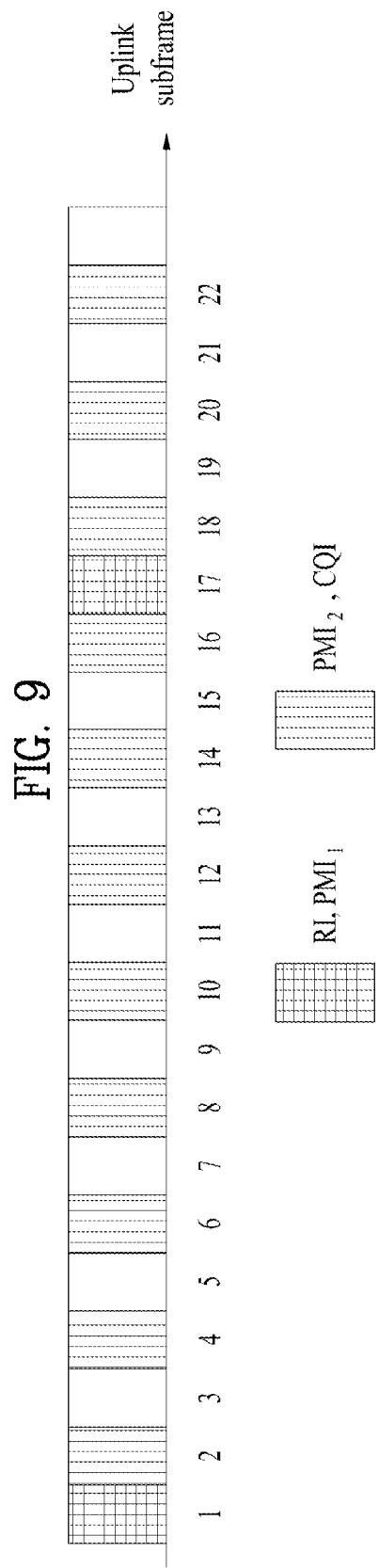
FIG. 9 is a view illustrating a general CSI feedback method when the number of Tx antennas of an eNB is 8 in an LTE-A wireless communication system.

FIG. 9 is a view illustrating a general CSI feedback method when the number of Tx antennas of an eNB is 8 in an LTE-A wireless communication system.

In FIG. 9, $PMI_1$ and $PMI_2$ are PMIs for an 8Tx codebook and a final PMI is determined by a combination of $PMI_1$ and $PMI_2$. That is, referring to the above-described Equation 8, $PMI_1$ corresponds to W1 and $PMI_2$ corresponds to W2.

Referring to FIG. 9, if a general CSI feedback configuration is extended to a CoMP CSI feedback configuration, since an Srv $PMI_1$ is transmitted together with an RI, the Srv PMI of the above-described embodiments should be modified to an Srv $PMI_2$. When the number of Tx antennas of the eNB is 8, an Nbr PMI also needs to be modified to an Nbr $PMI_1$ and an Nbr $PMI_2$.

On the other hand, the present invention may be applied even when the numbers of antennas of eNBs participating in the CoMP scheme differ from each other. For example, if the number of antennas of a serving eNB is N1 and the number of antennas of a neighboring eNB is N2, the Srv PMI and the Nbr PMI may be selected from a codebook for the N1 Tx antennas and a codebook for the N2 Tx antennas. Notably, this cannot be applied when the neighboring cell and the serving cell use the same PMI due to application of the CoMP JT scheme as shown in configuration number 2 of Table 3.

In the present invention, if there are different numbers of antennas of eNBs of cells to which the CoMP scheme is applied, a method may be considered for determining a CSI feedback mode according to the largest number of antennas and feeding back CoMP CSI information. In other words, a basic CSI feedback mode is configured according to the largest number of antenna ports, M, among RSs (e.g. CSI-RSs) transmitted from the eNBs to the UE for CoMP CSI feedback. Next, CSI corresponding to the determined CSI feedback mode is transmitted at a time when CSI feedback for the M antenna ports is transmitted. When CSI feedback for N antenna ports (where N is less than M) is transmitted, CSI for the N antenna ports rather than CSI for the M antenna ports is transmitted. For example, although $PMI_2$ which is a short-term/subband PMI should be transmitted due to a CSI feedback mode configuration for 8 Tx antennas, a PMI is selected from a codebook for 4 Tx antennas and is fed back when current feedback CSI is CSI corresponding to 4 Tx antennas.

For example, when an 8-port CSI-RS and a 4-port CSI-RS are present, a CSI feedback mode corresponding to 8 Tx antennas is configured. Therefore, CoMP CSI may be fed back based on the CSI feedback mode corresponding to the 8 Tx antennas as shown in FIG. 9.

In addition, a cell transmitting signals using 8 Tx antennas performs precoding using $PMI_1$ which is fed back along with an RI and using $PMI_2$ thereof which is fed back next. A cell transmitting signals using 4 Tx antennas performs precoding using a PMI thereof for the 4 Tx antennas after detecting only an RI value by disregarding $PMI_1$.

If a serving cell transmits signals using 8 Tx antennas, the Srv PMI is replaced with Srv $PMI_2$ and the Nbr PMI is transmitted unchanged using a 4Tx codebook. Moreover, if a neighboring cell transmits signals using 8 Tx antennas, the Nbr PMI is replaced with Nbr $PMI_2$ and the Srv PMI is transmitted unchanged using a 4Tx codebook. At this time, Nbr $PMI_1$ on which Nbr $PMI_2$ depends is transmitted together with the RI earlier than Nbr $PMI_2$, feedback order may be adjusted by interchanging CSI in subframe 2 and CSI in subframe 4 of each Tables 3 to 9.

Alternatively, cells to which the CoMP scheme is applied may be restrictively configured from the beginning as cells having the same number of antennas. In addition, even if different numbers of physical antennas are used, when the numbers of logical antennas are the same, the cells to which the CoMP scheme is applied may be configured.

Table 10 shown below indicates a CSI feedback configuration when three cells to which the CoMP scheme is applied use the same hierarchical PMI and Table 11 shown below indicates a CSI feedback configuration when three cells to which the CoMP scheme is applied use different hierarchical PMIs.

TABLE 10

| Configuration number | SF 1 | SF 2 | SF 4 | SF 6 | SF 8 | SF 10 | SF 12 |
|---|---|---|---|---|---|---|---|
| 1 | RI, Srv $PMI_1$ | Nbr1 $PMI_1$ | Nbr2 $PMI_1$ | Srv $PMI_2$, Srv CQI | Nbr1 PC, Nbr1 $PMI_2$, compCQI | Nbr2 PC, Nbr2 $PMI_2$, compCQI | |
| 2 | RI, Srv $PMI_1$ | Nbr1 $PMI_1$ | Nbr2 $PMI_1$ | Srv $PMI_2$, Srv CQI | Nbr1 $PMI_2$, compCQI | Nbr2 $PMI_2$, compCQI | Nbr1 PC, Nbr2 PC |
| 3 | RI, Srv $PMI_1$ | Nbr1 $PMI_1$, Nbr2 $PMI_1$ | Srv $PMI_2$, Srv CQI | Nbr1 PC, Nbr1 $PMI_2$, compCQI | Nbr2 PC, Nbr2 $PMI_2$, compCQI | | |
| 4 | RI, Srv $PMI_1$ | Nbr1 $PMI_1$, Nbr2 $PMI_1$ | Srv $PMI_2$, Srv CQI | Nbr1 $PMI_2$, compCQI | Nbr2 $PMI_2$, compCQI | Nbr1 PC, Nbr2 PC | |
| 5 | RI, Srv $PMI_1$ | Srv $PMI_2$, Srv CQI | Nbr1 $PMI_1$, Nbr1 $PMI_2$ Nbr1 CQI | Nbr2 $PMI_1$, Nbr2 $PMI_2$ Nbr2 CQI | Nbr1 PC, Nbr2 PC compCQI | | |
| 6 | RI, Srv $PMI_1$ | Srv $PMI_2$, Srv CQI | Nbr1 $PMI_1$, Nbr1 $PMI_2$ Nbr1 CQI | Nbr2 $PMI_1$, Nbr2 $PMI_2$ Nbr2 CQI | | | |

TABLE 11

| Configuration number | SF 1 | SF 2 | SF 4 | SF 6 | SF 8 | SF 10 | SF 12 |
|---|---|---|---|---|---|---|---|
| 1 | RI, Srv PMI$_1$ | Nbr1 PMI$_1$ | Nbr2 PMI | Srv PMI$_2$, Srv SQI | Nbr1 PC, Nbr1 PMI$_2$, compCQI | Nbr2 PC, (Temp), compCQI | |
| 2 | RI, Srv PMI$_1$ | Nbr1 PMI$_1$ | Nbr2 PMI | Srv PMI$_2$, Srv SQI | Nbr1 PMI$_2$, compCQI | Nbr2 PC, Nbr1 PC, (Temp), compCQI | |
| 3 | RI, Srv PMI$_1$ | Nbr1 PMI$_1$, Nbr2 PMI | Srv PMI$_2$, Srv CQI | Nbr1 PC, Nbr1 PMI$_2$, compCQI | Nbr2 PC, (Temp), compCQI | | |
| 4 | RI, Srv PMI$_1$ | Nbr1 PMI$_1$, Nbr2 PMI | Srv PMI$_2$, Srv CQI | Nbr1 PMI$_2$, compCQI | Nbr2 PC, Nbr1 PC, (Temp), compCQI | | |
| 5 | RI, Srv PMI$_1$ | Srv PMI$_2$, Srv CQI | Nbr1 PMI$_1$, Nbr1 PMI$_2$, Nbr1 CQI | Nbr2 PMI$_2$, Nbr2 CQI | Nbr2 PC, Nbr1 PC, (Temp), compCQI | | |
| 6 | RI, Srv PMI$_1$ | Srv PMI$_2$, Srv CQI | Nbr1 PMI$_1$, Nbr1 PMI$_2$, Nbr1 CQI | Nbr2 PMI$_2$, Nbr2 CQI | | | |

In particular, it is assumed in Table 10 that all cells use a 2-level hierarchical PMI which is divided into PMI$_1$ and PMI$_2$ and it is assumed in Table 11 that only a serving cell and a first neighboring cell use the 2-level hierarchical PMI. In Tables 10 and 11, SF indicates a subframe. In Tables 10 and 11, feedback information of shaded parts is long-term/wideband CSI including RI, PMI$_1$, Nbr2 PMI, etc. and feedback information of non-shaded parts is short-term/wideband CSI including PC, PMI$_2$, CQI, etc.

Subframes after subframes defined for the feedback configurations of Table 10 and Table 11 may be used to repeatedly transmit some of the previously transmitted CSI before a new RI is fed back. For example, in subframe 12 in configuration number 1 of Table 1, short-term/subband CSI starting from CSI in subframe 6 may be repeatedly transmitted again.

In addition, in Table 10 and Table 11, 'compCQI' is a transmitted value such that the eNB may measure a CQI in the case where the CoMP scheme is applied and 'compCQI' may be defined in various manners. For example, compCQI may be defined as a CQI when a CoMP scheme such as DPS, CB/CS, and JT is applied to one of a first neighboring cell and a second neighboring cell or as a CQI when the CoMP scheme is applied to both the first neighboring cell and the second neighboring cell. In order to reduce the size of a feedback payload, the aforementioned delta CQI, common CQI, and delta common CQI may be allocated.

In Table 11, 'Temp' indicates a remaining feedback payload when the second neighboring cell uses a general PMI rather than the 2-level hierarchical PMI and may be defined in various manners. For example, 'Temp' may be used as an additional payload for transmission of an enhanced PMI for Nbr2 PMI and transmission of Nbr1 PMI$_2$. The enhanced PMI for Nbr2 PMI is a difference vector or difference matrix between Nbr2 PMI and a PMI of a channel for the most recently estimated neighboring cell and PMI accuracy for the second neighboring cell may be raised by adding the enhanced PMI to Nbr2 PMI. Alternatively, 'Temp' may be defined a second best PMI having a second large metric for a channel for an estimated neighboring cell among PMIs of neighboring cells and PMI accuracy may be raised through interpolation with Nbr PMI using the second best PMI. When 'Temp' is used as additional payload for transmission of Nbr1 PMI$_2$, partial payload bits of Nbr1 PMI$_2$ may be transmitted through a subframe of predefined Nbr1 PMI$_2$ and some of the other payload bits may be transmitted using 'Temp'.

In Table 10 and Table 11, an RI may be fed back in a subframe different from that in which Srv PMI$_1$ is transmitted. For example, the RI is fed back in subframe 1 and Srv PMI$_1$ is fed back in subframe 2. The other CSI which is previously defined to be fed back in subframes starting from subframe 2 is fed back later by one feedback cycle starting from the next feedback subframe.

Additionally, the Nbr2 PMI in configuration numbers 1 and 2 of Table 11 may be redefined as short-term CSI rather than long-term CSI. The Nbr2 PMI redefined as the short-term CSI may be transmitted unchanged in subframe 4 or may be transmitted together with other CSI in subframe 10. Moreover, the CSI in subframe 6 or subframe 8 may be fed back in subframe 4 and subframe 6 and the Nbr2 PMI may be fed back in subframe 8.

In the above-described embodiments, the UE has fed back channel information of all of a serving cell and neighboring cells using one CSI feedback configuration (hereinafter, referred to as a single feedback configuration). However, CoMP CSI may be fed back individually using a feedback configuration for each of cells to which the CoMP scheme is applied (hereinafter, referred to as multiple feedback configurations).

As an example of the multiple feedback configurations, the serving cell may conform to a feedback procedure of FIG. 9 as in a conventional non-CoMP environment and the neighboring cells may transmit modified feedback information by the feedback procedure of FIG. 9. For example, a PC may be fed back together with PMI$_1$ instead of an RI and 'compCQI' may be fed back instead of a CQI.

Figure 10:
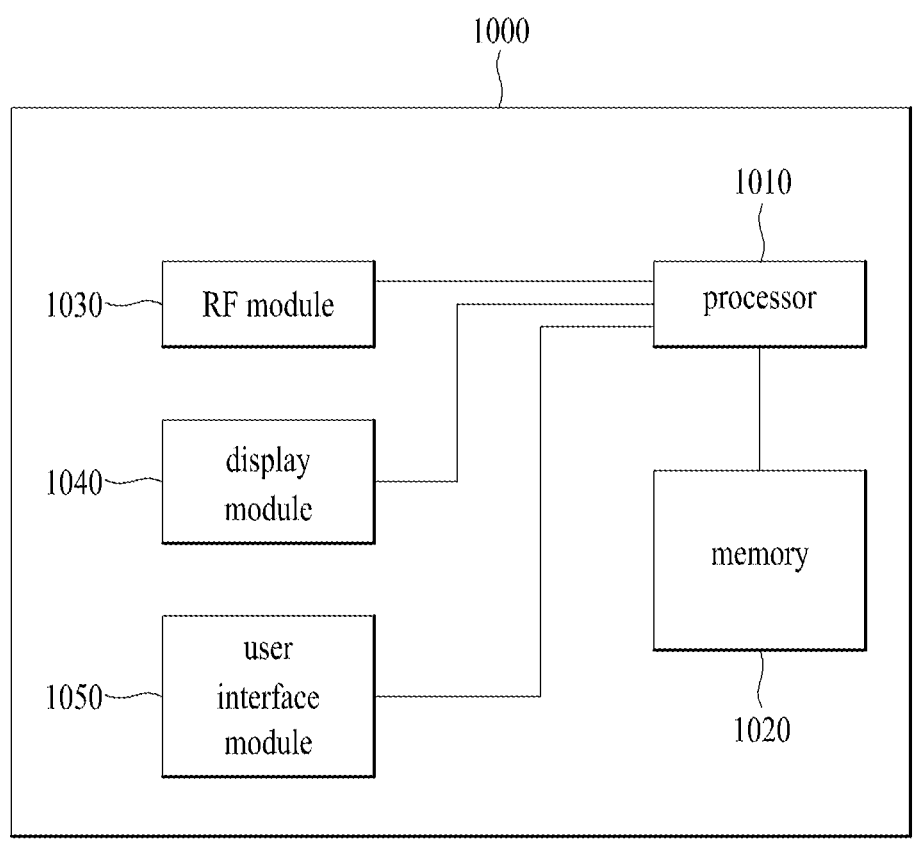
FIG. 10 is an exemplary block diagram of a communication apparatus according to one embodiment of the present invention.

FIG. 10 is an exemplary block diagram of a communication apparatus according to one embodiment of the present invention.

Referring to FIG. 10, a communication device 1000 includes a processor 1010, a memory 1020, an RF module 1030, a display module 1040, and a user interface module 1050.

The communication device 1000 is illustrated for convenience of the description and some modules can be omitted. Moreover, the communication device 1000 may further include necessary modules. Some modules of the communication device 1000 may be further divided into sub-modules. The processor 1010 is configured to perform operations according to the embodiment of the present invention exemplarily described with reference to the accompanying drawings. In particular, for the detailed operations of the processor 1010, reference may be made to the contents described with reference to FIGS. 1 to 9.

The memory 1020 is connected to the processor 1010 and stores an operating system, applications, program code, data, and the like. The RF module 1030 is connected to the processor 1010 and performs a function of converting a baseband signal into a radio signal or converting a radio signal into a baseband signal. For this, the RF module 1030 performs analog conversion, amplification, filtering, and frequency upconversion or inverse processes thereof. The display module 1040 is connected to the processor 1010 and displays various types of information. The display module 1240 may include, but is not limited to, a well-known element such as a Liquid Crystal Display (LCD), a Light Emitting Diode (LED), or an Organic Light Emitting Diode (OLED). The user interface module 1050 is connected to the processor 1010 and may include a combination of well-known interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

In the present disclosure, a specific operation described as being performed by a base station may be performed by an upper node of the base station in some cases. Namely, it is apparent that, in a network comprised of a plurality of network nodes including the base station, various operations performed for communication with a user equipment may be performed by the base station, or by network nodes other than the base station. The term 'base station' may be replaced with terms 'fixed station', 'Node B', 'eNode B' (eNB), 'access point', etc.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described CSI reporting method in a CoMP wireless communication system and the apparatus therefore have been described centering on an example applied to the 3GPP LTE system, the present invention is applicable to a variety of wireless communication systems in addition to the 3GPP LTE system.

The invention claimed is:

1. A method for transmitting channel state information at a user equipment in a multi-cell cooperative wireless communication system, comprising:

receiving a reference signal from a serving cell and one or more neighboring cells;

generating first channel state information, second channel state information and third channel state information, which are different types of channel state information from each other;

determining a feedback configuration mode based on channel state information priority;

mapping each of the first channel state information, the second channel state information and the third channel state information into one of a plurality of subframes including a first subframe, a second subframe and a third subframe, respectively, based on a mapping relationship defined for the feedback configuration mode; and transmitting each of the mapped channel state information to the serving cell, using the plurality of subframes, wherein a first feedback configuration mode is defined such that the first channel state information is mapped to the first subframe, the second channel state information is mapped to the second subframe and the third channel state information is mapped to the third subframe, wherein a second feedback configuration mode is defined such that the first channel state information is mapped to the first subframe, the second channel state information is mapped to the third subframe and the third channel state information is mapped to the second subframe, determining whether the feedback configuration mode is set to the first feedback configuration or the second feedback configuration based on the codebook size of the second channel state information compared to the payload size of the third channel state information.

2. The method according to claim 1, wherein the third channel state information includes channel state information for receiving signals simultaneously both from the serving cell and from the one or more neighboring cells.

3. The method according to claim 2, wherein the second channel state information includes channel state information for receiving signals only from the serving cell cooperating with the one or more neighboring cells.

4. The method according to claim 1, wherein the feedback configuration modes are distinguished according to the multi-cell cooperative communication type.

5. The method according to claim 1, wherein the mapped channel state information is transmitted to the serving cell through a Physical Uplink Control Channel (PUCCH) of each of the plurality of subframes.

6. A user equipment in a multi-cell cooperative wireless communication system, comprising:
a reception module that receives a reference signal from a serving cell and one or more neighboring cells;
a processor that generates first channel state information, second channel state information and third channel state information, which are different types of channel state information from each other, determines a feedback configuration mode based on channel state information priority, and maps each of the first channel state information, the second channel state information and the third channel state information into one of a plurality of subframes including a first subframe, a second subframe and a third subframe, respectively, based on a mapping relationship defined for the feedback configuration mode; and
a transmission module that transmits each of the mapped channel state information to the serving cell, using the plurality of subframes,
wherein a first feedback configuration mode is defined such that the first channel state information is mapped to the first subframe, the second channel state information is mapped to the second subframe and the third channel state information is mapped to the third subframe,
wherein a second feedback configuration mode is defined such that the first channel state information is mapped to the first subframe, the second channel state information is mapped to the third subframe and the third channel state information is mapped to the second subframe,
wherein the processor determines whether the feedback configuration mode is set to the first feedback configuration or the second feedback configuration based on the codebook size of the second channel state information compared to the payload size of the third channel state information.

7. The user equipment according to claim 6, wherein the channel state information for multi-cell cooperative communication includes channel state information for receiving signals simultaneously both from the serving cell and from the one or more neighboring cells.

8. The user equipment of claim 7, wherein the second channel state information includes channel state information for receiving signals only from the serving cell cooperating with the one or more neighboring cells.

9. The user equipment according to claim 6, wherein the feedback configuration modes are distinguished according to the multi-cell cooperative communication type.

10. The user equipment according to claim 6, wherein the mapped channel state information is transmitted to the serving cell through a Physical Uplink Control Channel (PUCCH) of each of the plurality of subframes.

* * * * *